US005756693A

United States Patent [19]

Kenyon et al.

[11] Patent Number: 5,756,693

[45] Date of Patent: May 26, 1998

[54] DISAZO COMPOUND

[75] Inventors: Ronald Wynford Kenyon, Bridport; Peter Gregory, Bolton, both of United Kingdom

[73] Assignee: Zeneca Limited, London, Germany

[21] Appl. No.: 737,613

[22] PCT Filed: May 17, 1995

[86] PCT No.: PCT/GB95/01110

§ 371 Date: Jan. 30, 1997

§ 102(e) Date: Jan. 30, 1997

[87] PCT Pub. No.: WO95/31505

PCT Pub. Date: Nov. 23, 1995

[30] Foreign Application Priority Data

| | | | |
|---|---|---|---|
| May 18, 1994 | [GB] | United Kingdom | 9409906 |
| May 18, 1994 | [GB] | United Kingdom | 9409923 |
| Sep. 6, 1994 | [GB] | United Kingdom | 9417874 |
| Sep. 6, 1994 | [GB] | United Kingdom | 9417877 |

[51] Int. Cl.[6] .......... C09B 31/08; C09D 11/00

[52] U.S. Cl. .......... 534/829; 534/797; 534/832; 106/31.48; 106/31.52

[58] Field of Search .......... 534/797, 829, 534/832; 106/31.52, 31.48

[56] References Cited

U.S. PATENT DOCUMENTS

| | | | |
|---|---|---|---|
| 4,626,284 | 12/1986 | Ohta et al. | 534/829 X |
| 4,724,001 | 2/1988 | Ohta et al. | 106/22 K |
| 5,198,022 | 3/1993 | Aulick et al. | 534/829 X |
| 5,354,369 | 10/1994 | Shimomura et al. | 106/31.52 X |
| 5,437,716 | 8/1995 | Sano et al. | 106/31.52 |
| 5,478,384 | 12/1995 | Takimoto et al. | 106/31.52 X |

FOREIGN PATENT DOCUMENTS

| | | |
|---|---|---|
| 36 16 128 | 11/1986 | Germany . |
| 60-243157 | 12/1985 | Japan . |
| 60-243176 | 12/1985 | Japan . |
| 61-57650 | 3/1986 | Japan . |
| 61-261377 | 11/1986 | Japan . |
| 2 193 969 | 2/1988 | United Kingdom . |

OTHER PUBLICATIONS

Miura et al: "Water-soluble disazo compounds", Chemical Abstracts, vol. 106, No. 4, Jan. 26, 1987, abstract No. 19955u, p. 66, see abstract & JP,A,62 057 650 (Mitsubishi Chemical Industries Co., Ltd.) Mar. 24, 1986, see compounds 10,11,13,15,19,22,27,32; p. 5, formula VII.

*Primary Examiner*—Fiona T. Powers
*Attorney, Agent, or Firm*—Pillsbury Madison & Sutro LLP

[57] ABSTRACT

A compound of the Formula (1) and salts thereof:

Formula (1)

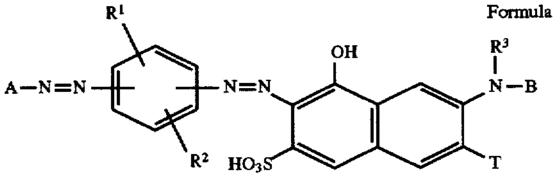

wherein:

A is optionally substituted phenyl or optionally substituted naphthyl;

$R^1$ is $NR^4R^5$;

$R^2$ is H, halo, —COOH, —$SO_2$0H, optionally substituted alkyl, optionally substituted alkoxy, or optionally substituted alkylthio;

$R^3$, $R^4$ & $R^5$ are each independently H or optionally substituted alkyl;

T is H or sulpho; and

B is H, optionally substituted alkyl or optionally substituted phenyl;

provided that the compound does not contain a piperazinyl group.

The compound is suitable for use as a black colorant in ink jet printing inks especially for printing on plain paper.

15 Claims, No Drawings

DISAZO COMPOUND

This invention relates to a coloured disazo compound and aqueous solutions thereof suitable for use in the coloration of substrates, especially sheet materials such as paper, and especially by a printing process such as ink jet printing.

According to a first aspect of the present invention there is provided a compound of the Formula (1) and salts thereof:

Formula (1)

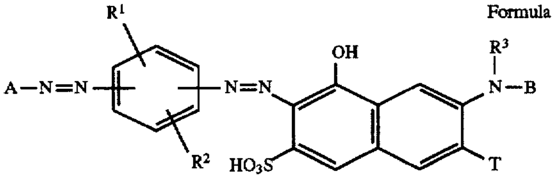

wherein:

A is optionally substituted phenyl or optionally substituted naphthyl;

$R^1$ is $NR^4R^5$;

$R^2$ is H, halo, —COOH, —$SO_2OH$, optionally substituted alkyl, optionally substituted alkoxy, or optionally substituted alkylthio;

$R^3$, $R^4$ & $R^5$ are each independently H or optionally substituted alkyl;

T is H or sulpho; and

B is H, optionally substituted alkyl or optionally substituted phenyl;

provided that the compound does not contain a piperazinyl group.

It is preferred that the compound of Formula (1) or (2) has at least as many carboxy (—COOH) groups as sulpho (—$SO_2OH$) groups, more preferably not more than 2 sulpho groups and especially only a single sulpho group. It is also preferred that the compound of Formula (1) or (2) has from 1 to 5, more preferably from 1 to 3, and especially 2 or 3 carboxy groups.

When A is substituted it preferably carries from one to three, especially one or two, substituents selected from:

carboxy; sulpho; —OH; —CN; —$NO_2$; —$PO(OH)_2$; —$B(OH)_2$;

halo, preferably —Cl;

alkyl, preferably $C_{1-4}$-alkyl and especially methyl;

alkoxy, preferably $C_{1-4}$-alkoxy and especially methoxy;

—$COOR^3$, wherein $R^3$ is as hereinbefore defined other than H;

—$SO_2R^6$ or —$COR^6$, wherein $R^6$ is optionally substituted $C_{1-4}$-alkyl or optionally substituted aryl;

optionally substituted amino, preferably —$NQ^1$ wherein $Q^1$ and $Q^2$ are each independently H or optionally substituted alkyl or aryl, or $Q^1$ and $Q^2$, taken together with the N atom to which they are attached, form an optionally substituted 5-, or 6-membered ring, especially an optionally substituted morpholine or piperidine ring; and acylamino, especially alkyl- or aryl-carbonylamino or alkyl- or aryl-sulphonylamino, more especially $C_{1-4}$-alkyl—CONH—or $C_{1-4}$-alkyl-$SO_2NH$—.

It is, however, preferred that A does not contain a heterocyclic substituent.

It is especially preferred that A is carboxyphenyl or carboxynaphthyl, especially 3- or 4-carboxyphenyl group or carboxyphenyl having one or two further substituents, especially one, selected from carboxy, sulpho, methyl, methoxy and chloro. Examples of optionally substituted phenyl and naphthyl groups represented by A are 4-carboxy-phenyl, 3-carboxy-phenyl, 3,5-dicarboxy-phenyl, 3,4-dicarboxyphenyl, 2-methyl-5-carboxy-phenyl, 2-methoxy-5-carboxyphenyl, 2-chloro-5-carboxyphenyl, 3- and 4-amino-5-carboxyphenyl, 2-sulpho-5-carboxy-phenyl, 4-carboxynaphth-1-yl, 5-carboxynaphth-1-yl, 6-carboxynaphth-1-yl, 7-carboxynaphth-1-yl, 6-carboxynaphth-2-yl and -sulpho-6-carboxynaphth-2-yl.

When $R^6$, $Q^1$ or $Q^2$ is optionally substituted alkyl it is preferably $C_{1-4}$-alkyl, such as methyl, ethyl, propyl or butyl optionally carrying a hydroxy or amino group. When $R^6$, $Q^1$ or $Q^2$ is optionally substituted aryl it is preferably phenyl.

$R^2$ is preferably $C_{1-4}$-alkyl, especially methyl or ethyl; $C_{1-4}$-alkoxy, especially methoxy or ethoxy, $C_{1-4}$-alkylthio, especially methylthio; Cl; H; COOH; or $SO_2OH$. $R^3$ is preferably H or $C_{1-4}$-alkyl, more preferably H, methyl or ethyl.

Where $R^4$ or $R^5$ is alkyl it is preferably $C_{1-4}$-alkyl. Where one of $R^4$ and $R^5$ is $C_{1-4}$-alkyl, the other is preferably H, although it is further preferred that both of $R^4$ and $R^5$ are H.

Where $Q^1$, $Q^2$, $R^2$, $R^3$, $R^4$, $R^5$ or $R^6$ is substituted alkyl or substituted alkoxy, or $Q^1$ and $Q^2$ form a ring, the substituent (s) is preferably selected from —COOH, —$SO_2OH$, OH, $NH_2$, $C_{1-4}$-alkoxy and halo, especially chloro. Where $R^6$, $Q^1$ or $Q_2$ is substituted aryl it is preferably phenyl and the substituent(s) is preferably in the 2-, 4-, 2,4-, 3,4- and 3,5-position(s) and selected from —COOH; —$SO_2OH$; OH; $NH_2$, CN; $NO_2$; $C_{1-4}$-alkyl; $C_{1-4}$-alkoxy; and halo, especially chloro.

The optionally substituted phenyl group represented by B may carry one or more substituents selected from the same group as the optional substituents on A, especially sulpho; carboxy; $C_{1-4}$-alkyl; $C_{1-4}$-alkoxy; and chloro. The optionally substituted alkyl group represented by B is preferably $C_{1-4}$-alkyl which may be unsubstituted or may carry one or more substituents selected from —$SO_2OH$, OH, $C_{1-4}$-alkoxy, amino, especially $NH_2$, and halo, and more especially, —COOH. It is preferred that B is H, unsubstituted phenyl or $C_{1-4}$-alkyl or phenyl substituted by one or two carboxy groups and, optionally further substituted by one or more substituents selected from those listed above as optional substituents or $C_{1-4}$-alkyl substituted by amino or piperidine.

Examples of preferred groups represented by B are 4-carboxy- phenyl, 3-carboxyphenyl, 3,5-dicarboxyphenyl, 3,4-dicarboxyphenyl, 2-methyl-5-carboxyphenyl, 2-methoxy-5-carboxyphenyl, 2-chloro-5-carboxyphenyl, 2-sulpho-5-carboxyphenyl, phenyl, H, methyl, ethyl, propyl, butyl, carboxymethyl, 2-carboxyethyl and 2-aminoethyl.

Where B is free of carboxy groups it is preferred that A carries at least one, and more preferably, two carboxy groups and where A is free of carboxy groups it is preferred that B carries at least one, and more preferably, two carboxy groups.

It is preferred that T is H.

A preferred compound of Formula (1) is where A is optionally substituted carboxyphenyl wherein any further substituent is selected from —COOH, —$SO_2OH$, methyl, methoxy, chloro and hydroxy, especially 3- or 4-carboxyphenyl or 3,4- or 3,5-dicarboxyphenyl; $R^2$ is H, methoxy or methyl; $R^4$ is H or $C_{1-4}$-alkyl; $R^1$ is H, $C_{1-4}$-alkyl, especially methyl or ethyl; T and $R^3$ are both H; and B is phenyl optionally having one or two carboxy substituents, especially phenyl, 3- or 4-carboxyphenyl or 3,4- or 3,5-dicarboxyphenyl. An especially preferred compound is where A is 3- or 4-carboxyphenyl or 3,4- or 3,5-dicarboxyphenyl; B is phenyl or selected from the groups represented by A; $R^2$ is H, methyl or methoxy; $R^5$ is H, methyl, ethyl, acetyl or propionyl; and $R^3$, $R^4$ and T are H.

Another preferred compound of Formula (1) is where A is optionally substituted carboxyphenyl wherein any further substituent is selected from —COOH, —$SO_2$OH, methyl, methoxy, chloro and hydroxy, especially 3- or 4-carboxyphenyl or 3,4- or 3,5-dicarboxyphenyl; $R^2$ is H, methoxy or methyl; $R^4$ is H or $C_{1-4}$-alkyl; $R^5$ is H, $C_{1-4}$-alkyl, especially methyl or ethyl; T and $R^3$ are both H; and B is H or $C_{1-4}$-alkyl optionally having one or two carboxy substituents, such as methyl, ethyl, carboxymethyl or 2-carboxyethyl. An especially preferred compound is where A is 3- or 4-carboxyphenyl or 3,4- or 3,5-dicarboxy-phenyl; B is H, methyl or ethyl; $R^2$ is H, methyl or methoxy; $R^5$ is H, methyl, ethyl, acetyl or propionyl; and $R^3$, $R^4$ and T are H.

In the compound of Formula (1) it is preferred that the two azo groups are in para (1,4) relationship across the central phenylene group and that $R^1$ and $R^2$ are also in para (1,4) relationship across the central phenylene group. It is also preferred that $R^1$ is ortho to the azo group linking A to the central phenylene group and that $R^2$ is ortho to the azo group linking the Gamma acid moiety to the central phenylene group.

In the compound of Formula (1) it is preferred that all carboxy groups are in positions which are not adjacent to groups with which they can form intramolecular hydrogen bonds, such as —$NH^2$, —NH— and —OH groups. Accordingly a preferred compound according to the invention is of Formula (2) or a salt thereof:

Formula (2)

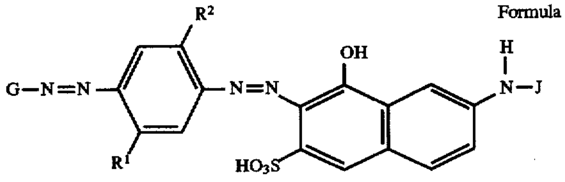

wherein:

G is 3-carboxyphenyl, 4-carboxyphenyl, 3,4-dicarboxyphenyl, 3,5-dicarboxyphenyl, or 2-methyl-5-carboxyphenyl;

J is H, methyl, ethyl, carboxymethyl, phenyl, 3-carboxyphenyl, 4-carboxyphenyl, 3,4-dicarboxyphenyl or 3,5-dicarboxyphenyl; and $R^1$ and $R^2$ are as hereinbefore defined.

In the compound of Formula (2) it is preferred that $R^1$ is $NH_2$ or —NH—$C_{1-4}$-alkyl, especially methylamino or ethylamino; and $R^2$ is H, $C_{1-4}$-alkyl, especially methyl or $C_{1-4}$-alkoxy, especially methoxy; halo, especially chloro; or sulpho. It is especially preferred that $R^1$ is $NH_2$ and $R^2$ is $C_{1-4}$-alkoxy, especially methoxy.

The compound of Formula (1) may be in the free acid form, as shown, but is preferably in the form of a salt with a cation such as an alkali metal, ammonium or optionally substituted $C_{1-4}$-alkyl-ammonium cation or a mixture of such cations. The preferred $C_{1-4}$-alkyl-ammonium cation consists of a nitrogen atom having up to four substituents selected from $C_{1-4}$-alkyl and hydroxy-$C_{1-4}$-alkyl, for example mono-, di-,tri- and tetra-($C_{1-4}$-alkyl)-ammonium and mono-, di-, tri- and tetra-(hydroxy-$C_{1-4}$-alkyl) ammonium. It is, however, especially preferred that the cation is ammonium (i.e. $NH_4^+$), methylammonium, dimethylammonium or triethylammonium or that the dye of Formula (1) is in the form of a mixed salt with alkali metal (especially lithium or sodium), and ammonium cations.

Examples of optionally substituted $C_{1-4}$-alkylammonium cations include methylammonium, ethylammonium, dimethylammonium, diethyl-ammonium, trimethylammonium, triethylammonium, tri-(2-hydroxyethyl)-ammonium and tetramethylammonium.

The present compounds can be prepared by diazotising an amine of formula A—$NH_2$, preferably below 5° C. using a nitrite and mineral acid, coupling with a substituted aniline carrying $R^1$ and $R^2$ to give a monoazo compound, diazotising the resultant monoazo compound and coupling with a compound of Formula (3):

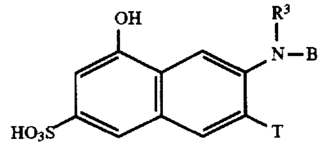

Formula (3)

Compounds of Formula (3) in which B and $R^3$ are other than H, may be prepared using the Bucherer reaction in which 1-hydroxy-3-sulpho-7-hydroxy (or 7-amino)-naphthalene or 1-hydroxy-3,6-disulpho-7-hydroxy (or 7-amino)-naphthalene is reacted with an amine, $R^3$NHB, in the presence of an alkali metal or ammonium sulphite and bisulphite (e.g. $Na_2SO_3$ and $NaHSO_3$) with heating, preferably from 60°–100° C. and especially 70°–90° C. In these processes A, $R^1$, $R^2$, $R^3$, T and B are as hereinbefore defined.

The present invention relates not only to a compound of Formula (1), but also to a composition comprising two or more compounds of Formula (1). An example of such a composition is a mixture containing two compounds of Formula (1) in which T, $R^1$, $R^2$ and $R^3$ are identical in both compounds but the identities of A and/or B differ.

It is preferred that such a composition contains two compounds of Formula (1) in a weight ratio of 99:1 to 1:99, more preferably 90:10 to 10:90, especially 80:20 to 20:80, more especially 60:40 to 40:60.

The compound or composition of the present invention can be converted into its ammonium or optionally substituted lower alkyl-ammonium salt by dissolving the compound in the form of a salt with an alkali metal, acidifying with a mineral acid, e.g. HCl, adjusting the solution to pH 9–9.5 with ammonia or an optionally substituted lower alkylamine and removing alkali metal and chloride ions by dialysis.

It will be understood that the present invention covers all tautomeric forms of a compound of Formula (1), e.g. the tautomeric equivalent of Formula (1) in which the hydroxy group on the Gamma acid moiety is in the keto form.

A compound or composition of the present invention, particularly in the form of its ammonium or optionally substituted lower alkylammonium salt, is a useful colorant for an ink. It exhibits high solubility in water and aqueous media and good water fastness and gives a print with a strong black shade on plain paper. Compounds wherein $R^1$ is $NH_2$ or methylamino and $R^2$ is H, alkyl, especially methyl or alkoxy, especially methoxy, perform particularly well. Especially preferred are compounds in which $R^1$ is $NH_2$ and $R^2$ is methoxy as these give images on plain paper with an intense neutral black shade, i.e. the a* and b* values in the CIEL*a*b* Color System are close to zero. The compound and composition are versatile, exhibiting high water fastness on alkaline, neutral and acid papers, good solubility in aqueous ink media, minimal bronzing and give strong neutral black images.

A suitable ink comprises a compound or a composition according to the present invention and a liquid medium, preferably an aqueous medium. It is preferred that the compound or composition is completely dissolved in the liquid medium to form a solution.

The ink preferably contains from 0.5% to 20%, more preferably from 0.5% to 15%, and especially from 1% to 3%, by weight of the compound or composition, based on the total weight of the ink. Although many inks contain less than 5% by weight of colorant, it is desirable that the compound or composition has a water solubility of around 10% or more to allow the preparation of concentrates from which more dilute inks can be prepared and to minimise the chance of precipitation of colorant if evaporation of solvent occurs during use of the ink.

The liquid medium is preferably water or a mixture comprising water and a water-soluble organic solvent, preferably in a weight ratio from 99:1 to 1:99, more preferably from 95:1 to 50:50 and especially from 90:10 to 60:40.

The water-soluble organic solvent is preferably a $C_{1-4}$-alkanol such as methanol, ethanol, n-propanol, i-propanol, n-butanol, s-butanol, t-butanol or i-butanol; an amide such as dimethylformamide or dimethylacetamide; a ketone or ketone alcohol such as acetone or diacetone alcohol; an ether such as tetrahydrofuran or dioxane; an oligo- or poly-(alkylene glycol) such as diethylene glycol, triethylene glycol, polyethylene glycol or polypropylene glycol; an alkylene glycol or thioglycol containing a $C_2$–$C_6$-alkylene group such as ethylene glycol, propylene glycol, butylene glycol, pentylene glycol or hexylene glycol and thiodiglycol; a polyol such as glycerol or 1,2,6-hexanetriol; a lower alkyl ether of a polyhydric alcohol such as 2-methoxyethanol, 2-(2-methoxyethoxy)ethanol, 2-(2-ethoxyethoxy)-ethanol, 2-[2-(2-methoxy-ethoxy)ethoxy] ethanol, 2-[2-(2-ethoxyethoxy)-ethoxy]-ethanol; a heterocyclic ketone, such as 2-pyrrolidone and N-methyl-2-pyrrolidone; or a mixture containing two or more of the aforementioned water-soluble organic solvents, for example thiodiglycol and a second glycol or diethylene glycol and 2-pyrrolidone.

Preferred water-soluble organic solvents are selected from 2-pyrrolidone, N-methylpyrrolidone, alkylene glycol and oligo-(alkylene glycol)s such as ethylene glycol, diethylene glycol, triethylene glycol and lower alkyl ethers of polyhydric alcohols such as or 2 -methoxy-2-ethoxy-2-ethoxyethanol; and polyethylene glycols with a molecular weight of up to 500. A preferred specific solvent mixture is a binary or ternary mixture of water and/or diethylene glycol and/or, 2-pyrrolidone or N-methylpyrrolidone in a weight ratios 75-95:25-5 and 60-80:0-20:0-20 respectively.

Examples of suitable ink media are given in U.S. Pat. No. 4,963,189, U.S. Pat. No. 4,703,113, U.S. Pat. No. 4,626,284 and EP 4,251,50A.

A further aspect of the present invention provides a process for printing a substrate with an ink using an ink jet printer, characterised in that the ink contains at least one compound according to the first aspect of the present invention.

A suitable process for the application of an ink as hereinbefore defined comprises forming the ink into small droplets by ejection from a reservoir through a small orifice so that the droplets of ink are directed at a substrate. This process is commonly referred to as ink jet printing, and the ink jet printing processes for the present inks are preferably piezoelectric ink jet printing and, more especially, thermal ink jet printing. In thermal ink jet printing, programmed pulses of heat are applied to the ink in the reservoir by means of a resistor adjacent to the orifice, during relative movement between the substrate and the reservoir.

A preferred substrate is an overhead projector slide or a cellulosic substrate, especially cotton or paper, including plain and treated papers, which may have an acid, alkaline or neutral character.

The preferred ink used in the process is as hereinbefore described.

According to a still further aspect of the present invention there is provided a paper or an overhead projector slide carrying a printed image comprising a compound of Formula (1) as defined herein.

The invention is further illustrated by the following Examples in which all parts and percentages are by weight unless otherwise indicated.

EXAMPLE 1

Preparation of the Compound of Formula (A)

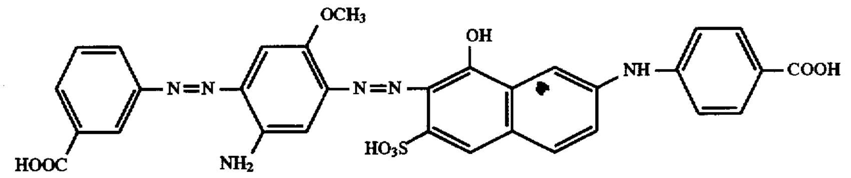

(A)

Stage 1

To a stirred suspension of 3-aminobenzoic acid (27.4 g) in ice/water (500 ml), HCl (35%, 50 ml) was added, followed by a solution of $NaNO_2$ (15.2 g) in water (100 ml), maintaining the temperature at 0°–10° C. by the addition of small quantities of ice as necessary. When the addition was complete the resultant diazo solution was stirred at 0°–10° C. for 1 hour and residual $HNO_2$ destroyed by the addition of sulphamic acid. 3-Amino-4-methoxyacetanilide (40 g) was dissolved in methylated spirits (74% OP, 500 ml) and added to the above diazo solution at 0°–10° C. and the mixture was stirred for 18 hours, allowing the temperature to rise to 20° C. The precipitated product was filtered off and the filter cake washed with water (2000 ml) and dried at 60° C.

Stage 2

The product of Stage 1 (19.7 g) was dissolved in water (500 ml) at room temperature by adding NaOH liquor to raise the pH to 10–11. A solution of $NaNO_2$ (4.5 g) in water (50 ml) then added. The resulting solution was added to a mixture of HCl (35%, 30 ml) and ice-water (100 ml) over 10 minutes, maintaining the temperature at 0°–10° C. After 2 hours at 0°–10° C., excess $HNO_2$ was destroyed by addition of sulphamic acid, to give a diazo solution.

N-(4-carboxyphenyl)Gamma acid (25 g) was dissolved in water (400 ml) by adding NaOH liquor to pH 9.0 and the solution was cooled to 0°–10° C. The diazo solution was added slowly over 10 minutes to the solution of N-(4-carboxyphenyl)Gamma acid, maintaining the pH at 8–9 by addition of 2N NaOH solution. The mixture was then heated to 50°–60° C. and salted with 7% NaCl. The precipitated product of Formula (A) (mainly Na salt) was filtered and washed with 10% NaCl solution.

Stage 3

A portion of the intermediate product from Stage 2 (as Na+salt, 20 g) was heated in a mixture of 2N NaOH (600 ml) and methylated spirits (740 CP, 400 ml) at 65°–70° C. for 2 hours. The solution was cooled, adjusted to pH 6 with 35%

HCl and the precipitated product of Formula (A) was filtered off and washed with 10% NaCl solution.

Stage 4

The product from Stage 3 was dissolved in water (1.51) by addition of concentrated $NH_4OH$ to pH 9–9.5. This solution was added to 1N HCl (1000 ml) and the product of Formula (A) (free acid) was filtered and washed with 1N HCl. The dissolution and re-precipitation procedure was repeated and the resultant paste was added to water (51) and the pH adjusted to 9.0 with concentrated NHOH. The resulting solution was dialysed until $Cl^-$ could no longer be detected, screened through a 0.45 µm filter, and the product of Formula (A) ($NH_4^+$ salt) isolated by evaporation.

Evaluation

The aqueous solubility of the ammonium salt of the compound of Formula (A) is >10%. A portion of this salt (2.5 parts) was dissolved in a mixture of water (90 parts) and diethylene glycol (10 parts) and the solution printed onto plain paper using a thermal ink jet printer. The image had a strong, neutral black shade with high water fastness.

EXAMPLE 2

Preparation of the compound of Formula (B)

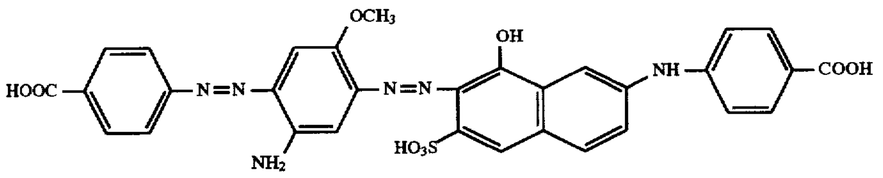

(B)

The procedure of Example 1 was repeated except that in place of the 3-carboxybenzoic acid used in Stage 1 there was used the same amount of 4-carboxybenzoic acid to produce the product of Formula (B) (as $NH_4^+$ salt).

Evaluation

The aqueous solubility of the $NH_4^+$ salt of the compound of Formula (B) is >10%. When this salt was made into an ink and applied to plain paper by ink jet printing, as described in the Evaluation stage of Example 1, the intense neutral black image had a high optical density and very high water-fastness.

EXAMPLE 3

Preparation of the compound of Example (C)

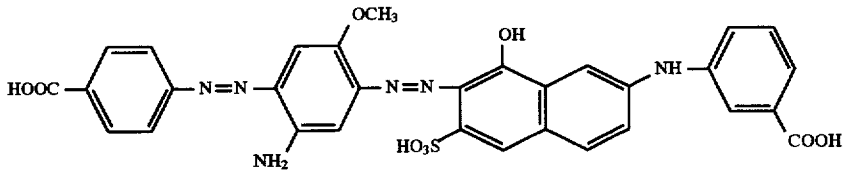

(C)

The method of Example 1 was repeated except that in place of 3-aminobenzoic acid used in Stage 1 there was used the same amount of 4-aminobenzoic acid and in place of the N-(4-carboxyphenyl)Gamma acid used in Stage 2 there was used the same amount of N-(3-carboxyphenyl)-Gamma acid to produce the compound of Formula (C) (as $NH_4$ salt).

Evaluation

The $NH_4^+$ salt of the compound of Formula (C) has an aqueous solubility >10%. When this salt was made into an ink and applied to plain paper by ink jet printing, as described in the Evaluation stage of Example 1, the intense neutral black image had a high optical density and very high water-fastness.

EXAMPLE 4

Preparation of the compound of Formula (D)

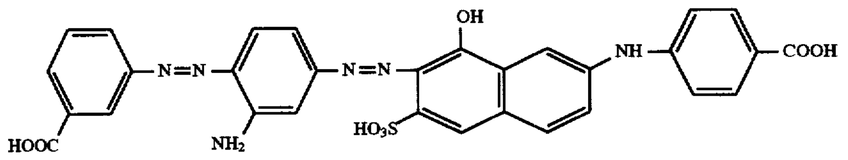

(D)

The procedure of Example 1 was repeated except that in place of the 3-amino-4-methoxyacetanilide used in Stage 1 there was used an equivalent amount of 3-aminoacetanilide to give the product of Formula (D).

Evaluation

The aqueous solubility of the $NH_4^+$ salt of the compound of Formula (D) is >10%. When a portion of this salt was made into an ink and applied to plain paper by ink jet printing, as described in the Evaluation stage of Example 1, the intense neutral black image had a high optical density and very high water fastness.

EXAMPLE 5

Preparation of the compound of Formula (E)

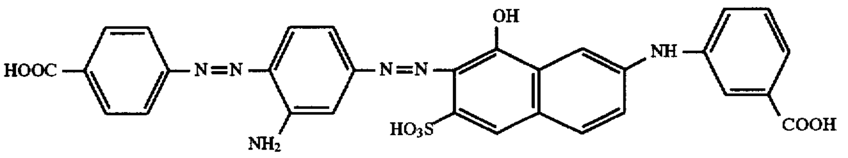

(E)

The method of Example 1 was repeated except that in place of the 3-aminobenzoic acid and 3-amino-4-methoxyacetanilide used in Stage 1 there were used equivalent amount of 4-aminobenzoic acid and 3-aminoacetanilide and in place of the N-(4-carboxyphenyl)Gamma acid used in Stage 2 there was used the same amount of N-(3-carboxyphenyl)-Gamma acid to produce the compound of Formula (E) (as $NH_4^+$ salt).

Evaluation

The aqueous solubility of the ammonium salt of the compound of Formula (E) is >10%. When this salt was made into an ink and applied to plain paper, as described in Example 1, the image had a high optical density and very high water-fastness.

EXAMPLE 6

Preparation of the compound of Formula (F)

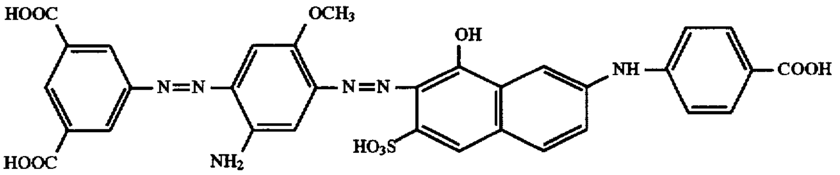

(F)

The method of Example 1 was repeated except that in place of the 3-carboxybenzoic acid used in Stage 1 there was used an equivalent amount of 3,5-dicarboxybenzoic acid to produce the compound of Formula (F) as ammonium salt.

Evaluation

The aqueous solubility of the ammonium salt of the compound of Formula (F) is >10%. When this salt was made into an ink and applied to plain paper by ink jet printing, as described in Example 1, the image had similar properties to that of the image from the ink containing the compound of Formula (A).

EXAMPLE 7

Preparation of compound of Formula (G)

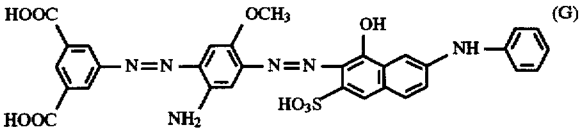

(G)

The procedure of Example 1 was repeated except that in place of the 3-aminobenzoic acid used in Stage 1 there was used an equivalent amount of 5-aminoisophthalic acid and in place of the N-(4-carboxy-phenyl)-Gamma acid used in Stage 2 there was used an equivalent amount of N-phenyl-Gamma acid to produce the compound of Formula (G) as ammonium salt.

Evaluation

The aqueous solubility of the ammonium salt of the compound of Formula (G) is about 9%. When this salt was made into an ink and applied to plain paper by ink jet printing, as described in Example 1, the image had a high optical density and very high water-fastness.

EXAMPLE 8

Preparation of the Compound of Formula (H)

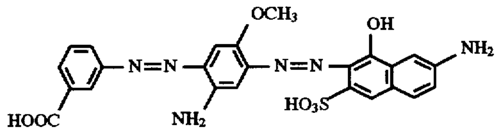

(H)

Stage 1

To a stirred suspension of 3-aminobenzoic acid (13.7 g, 0.1M) in ice/water (150 ml), HCl (35%, 30 ml) was added, followed by a solution of $NaNO_2$ (7 g) in water (50 ml), maintaining the temperature at 0°–10° C. by the addition of small quantities of ice as necessary. When the addition was complete the resultant diazo solution was stirred at 0°–10° C. for 1 hour and residual $HNO_2$ destroyed by the addition of sulphamic acid (10% solution).

3-Amino-4-methoxyacetanilide (20 g, 0.1M) was dissolved in methylated spirits (74% OP, 500 ml) and added to the above diazo solution. The mixture was stirred for 18 hours at 20°–25° C. The precipitated product was filtered off and the filter cake washed with water (500 ml).

Stage 2

The paste from Stage 1 was dissolved in water (500 ml) at room temperature by adding 2N NaOH to pH 9. $NaNO_2$ solution (7 g) in water (50 ml) was added and the reaction mixture acidified by adding to a mixture of HCl (35%, 30 ml) and ice-water (150 ml) over 10 minutes, maintaining the temperature at 0°–10° C. After 2 hours at 0°–10° C. the excess $HNO_2$ was destroyed by adding sulphamic acid, to give a diazo solution.

An aqueous solution of Gamma acid was prepared by adding Gamma acid (26.5 g, 0.1M) to water (400 ml) followed by 2N NaOH to pH 9.0 and $Na_2CO_3$ (log). The resulting solution was cooled to 0°–10° C. and the diazo solution was added slowly over 10 minutes, maintaining the pH at 9–10 by addition of 2N NaOH, and then stirred for 1 hour at 0°–10° C.

Stage 3

The solution from Stage 2 was mixed with NaOH liquor (47%, 300 ml) and methylated spirits (74% OP, 1000 ml) and heated to 70°–80° C. for 4 hours (to hydrolyse the acetamido group to free amine) and adjusted to pH 7.0 by the addition of HCl. The precipitated compound of Formula (H) (free acid) was collected by filtration and washed with water.

Stage 4

The paste from Stage 3 was dissolved in water (500 ml) and slowly added to 1N HCl (1000 ml) and the compound of Formula (H) (free acid) was filtered and washed with 1N HCl. The isolated paste was added to water (500 ml) and the pH adjusted to 9.0–9.5 with concentrated $NH_4OH$ solution. The resulting solution was dialysed until $Cl^-$ ion could no longer be detected, screened through a 0.45 μm filter, water evaporated off and the solid dried.

The aqueous solubility of the ammonium salt of the compound of Formula (H) is about 9%. This salt (2.5 parts) was added to a mixture of water (90 parts) and 2-pyrrolidone (10 parts) and printed onto plain paper using a thermal ink jet printer. The print had a strong black shade with high water fastness (97%), no visible bronzing and an optical density of 1.38. The same salt was dissolved in a mixture of water (90 parts) and diethylene glycol (10 parts) and printed onto plain paper to give a print with good light fastness.

EXAMPLE 9

Preparation of the Compound of Formula (J)

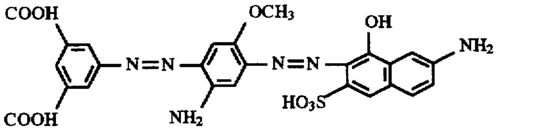
(J)

The method of Example 8 was repeated except that in place of the 3-aminobenzoic acid used in Stage 1 there was used 5-amino-isophthalic acid (18.1 g) to produce the compound of Formula (J) as ammonium salt.

Evaluation

The aqueous solubility of the ammonium salt of the compound of Formula (J) is >10%. A portion of this salt (2.5 parts), was made into inks as described in Example 1 and printed onto plain paper using a thermal ink jet printer. The resultant print had a neutral black shade with very high water-fastness (96%) and high optical density.

EXAMPLE 10

Preparation of the Compound of Formula (K)

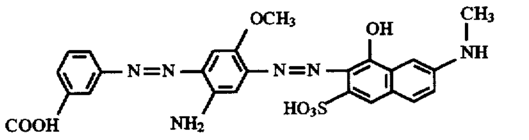
(K)

The method of Example 8 was followed except that in place of the Gamma acid used in Stage 2 there was used N-methyl-Gamma acid (20 g) to produce the compound of Formula (K) as ammonium salt.

Evaluation

The aqueous solubility of the ammonium salt of the compound of Formula (K) is about 8%. This salt was converted into inks and printed onto plain paper as described in Example 8. The resulting prints had a very high resistance to water (97%) and neutral black shades.

EXAMPLE 11

Preparation of the compound of Formula (L)

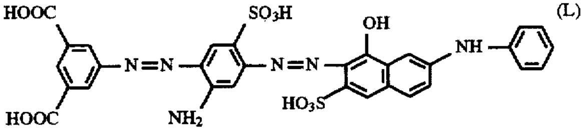
(L)

The procedure of Example 1 was repeated except that in place of the 3-aminobenzoic acid and the 3-amino-4-methoxyacetanilide used in Stage 1 there were used equivalent amounts of 5-aminoisophthalic acid and 3-amino-4-sulphoacetanilide respectively and in place of the N-(4-carboxyphenyl)-Gamma acid used in Stage 2 there was used an equivalent amount of N-phenyl-Gamma acid to produce the compound of Formula (L) as ammonium salt.

Evaluation

The aqueous solubility of the ammonium salt of the compound of Formula (L) is >10%. When this salt was made into an ink and applied to plain paper by ink jet printing, as described in the Evaluation stage of Example 1, the image had a high optical density and very high water-fastness.

EXAMPLE 12

Preparation of the compound of Formula (M)

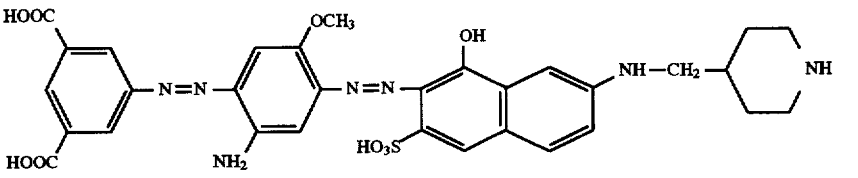
(M)

The procedure of Example 8 was repeated except that in place of the 3-aminobenzoic acid used in Stage 1 there was used an equivalent amount of 5-aminoisophthalic acid and in place of the Gamma acid used in Stage 2 there was used an equivalent amount of N-(piperid-4-ylmethyl)-Gamma acid to produce the compound of Formula (M) as ammonium salt.

Evaluation

The aqueous solubility of the ammonium salt of the compound of Formula (M) is about 6%. When this salt was made into an ink and applied to plain paper by ink jet printing, as described in the Evaluation stage of Example 1, the image had a high optical density and very high water-fastness.

EXAMPLE 13

Preparation of the compound of Formula (N)

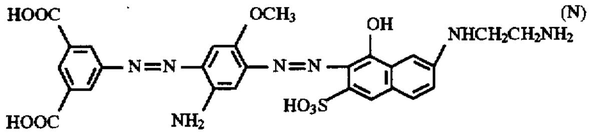

(N)

The procedure of Example 8 was repeated except that in place of the 3-aminobenzoic acid used in Stage 1 there was used an equivalent amount of 5-aminoisophthalic acid and in place of the Gamma acid used in Stage 2 there was used an equivalent amount of N-(2-aminoethyl)-Gamma acid to produce the compound of Formula (N) as ammonium salt.

Evaluation

The aqueous solubility of the ammonium salt of the compound of Formula (N) is >10%. When this salt was made into an ink and applied to plain paper by ink jet printing, as described in the Evaluation stage of Example 1, the image had a high optical density and very high waterfastness.

EXAMPLE 14

Further inks may be prepared having the compositions described in Tables 1 and 2 below wherein Inks 1–5 contain the compound of Formula (A), Inks 6–10 contain the compound of Formula (B), Inks 11–15 contain the compound of Formula (C), Inks 16–20 contain the compound of Formula (D), Inks 21–25 contain the compound of Formula (E), Inks 26–30 contain the compound of Formula (G) and Inks 30 to 34 the compound of Formula (H).

TABLE 1

| Ink No. | Dye Content | Water | PG | DEG | NMP | DMK | NaOH | Na Stearate | IPA | MEOH | DMA | MIBK |
|---|---|---|---|---|---|---|---|---|---|---|---|---|
| 1 | 2.0 | 80 | 5 | | 6 | 4 | | | | | 5 | |
| 2 | 3.0 | 90 | | 5 | 5 | | 0.2 | | | | | |
| 3 | 1.0 | 85 | 5 | | 2 | 2 | | 0.1 | | 5 | 1 | |
| 4 | 2.1 | 91 | | 8 | | | | | | | | 1 |
| 5 | 3.1 | 86 | 5 | | | | | 0.2 | 4 | | | 5 |
| 6 | 1.1 | 81 | | | 9 | | 0.5 | 0.5 | | | 9 | |
| 7 | 2.5 | 60 | 4 | 15 | 3 | 3 | | | 6 | 10 | 5 | 4 |
| 8 | 1.9 | 70 | | 20 | | | | | 10 | | | |
| 9 | 2.4 | 75 | 5 | 4 | | 5 | | | | 6 | | 5 |
| 10 | 4.1 | 80 | 3 | 5 | 2 | 10 | | 0.3 | | | | |
| 11 | 3.2 | 65 | | 5 | 4 | 6 | | | 5 | 4 | 6 | 5 |
| 12 | 4.6 | 96 | | | | | | | | 4 | | |
| 13 | 0.8 | 90 | 5 | | | | | | 5 | | | |
| 14 | 1.2 | 80 | 2 | 6 | 2 | 5 | | | 1 | | 4 | |
| 15 | 1.8 | 80 | | 5 | | | | | | | 15 | |
| 16 | 2.6 | 84 | | | 11 | | | | | | 5 | |
| 17 | 3.3 | 80 | 2 | | | 10 | | | | 2 | | 6 |
| 18 | 1.7 | 90 | | | | 7 | 0.3 | | 3 | | | |
| 19 | 1.5 | 69 | 2 | 20 | 2 | 1 | | | | | 3 | 3 |
| 20 | 1.6 | 91 | | | 4 | | | | | | 5 | |

Key to abbreviations is at foot of Table 2

TABLE 2

| Ink No. | Dye Content | Water | PG | DEG | NMP | CET | TBT | Na Stearate | BDL | PHO | 2P | TDG |
|---|---|---|---|---|---|---|---|---|---|---|---|---|
| 21 | 3.0 | 80 | 15 | | | 0.2 | | | | | 5 | |
| 22 | 2.0 | 90 | | 5 | | | | | | 1.2 | | 5 |
| 23 | 1.5 | 85 | 5 | 5 | | 0.15 | 5.0 | 0.2 | | | | |
| 24 | 2.5 | 90 | | 6 | 4 | | | | | 0.12 | | |
| 25 | 3.1 | 82 | 4 | 8 | | 0.3 | | | | | | 6 |
| 26 | 0.9 | 85 | | 10 | | | | | 5 | 0.2 | | |
| 27 | 1.5 | 90 | | 5 | 5 | | | 0.3 | | | | |
| 28 | 2.9 | 70 | | 10 | 4 | | | | 1 | | 4 | 11 |
| 29 | 2.2 | 75 | 4 | 10 | 3 | | | | 2 | | 6 | |
| 30 | 2.6 | 91 | | | 6 | | | | | | 3 | |
| 31 | 3.2 | 76 | | 9 | 7 | | 3.0 | | | 0.95 | 5 | |
| 32 | 4.0 | 78 | 5 | 11 | | | | | | | 6 | |
| 33 | 3.3 | 86 | | | 7 | | | | | | 7 | |
| 34 | 1.1 | 70 | 5 | 5 | 5 | 0.1 | 0.2 | 0.1 | 5 | 0.1 | 5 | 5 |

The following abbreviations are used in Tables 1 and 2:
PG = propylene glycol
DEG = diethylene glycol
NMP = N-methylpyrrolidone
DMK = dimethylketone
IPA = i-propanol
MEOH = methanol
TDG = thiodiglycol
BDL = butane-2,3-diol
2P = 2-pyrrolidone TABLE 2-continued

| Ink No. | Dye Content | Water | PG | DEG | NMP | CET | TBT | Na Stearate | BDL | PHO | 2P | TDG |
|---|---|---|---|---|---|---|---|---|---|---|---|---|

MIBK = methyl-i-butylketone
PHO = Na.HPO.
DMA = dimethylamine
CET = cetyl ammonium bromide (surfactant)

We claim:

1. A compound of the Formula (1) or a salt thereof:

Formula (1)

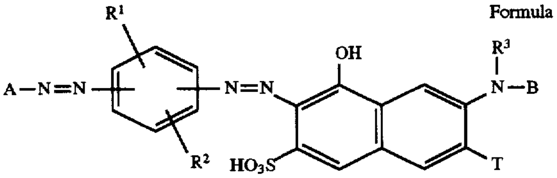

wherein:

A is optionally substituted phenyl or optionally substituted naphthyl;

$R^1$ is $NR^4R^5$;

$R^2$ is H, halo, —COOH, optionally substituted alkyl, optionally substituted alkoxy, or optionally substituted alkylthio;

$R^3$, $R^4$ & $R^5$ are each independently H or optionally substituted alkyl;

T is H or sulpho; and

B is H, optionally substituted alkyl or optionally substituted phenyl;

provided that the compound does not contain a piperazinyl group; and provided that the compound has at least as many carboxy groups as sulpho groups.

2. A compound according to claim 1 wherein A is selected from 3-carboxyphenyl, 4-carboxyphenyl, 3,5-dicarboxyphenyl and 3,4-dicarboxy-phenyl.

3. A compound according to claim 1 or claim 2 wherein $R^1$ is $NH_2$ or NH—$C_{1-4}$-alkyl.

4. A compound according to any one of claims 1 to 3 wherein $R^2$ is selected from H, methyl, methoxy, chloro, and —COOH.

5. A compound according to any one of claims 1 to 4 wherein B is selected from phenyl, 3-carboxyphenyl, 4-carboxyphenyl, 3,5-dicarboxy- phenyl, H and methyl.

6. A compound selected from the group comprising 1-hydroxy-2-[2-methoxy-4-(3-carboxyphenylazo)-5-amino-phenylazo]-3-sulpho-7-(4-carboxyphenylamino)-naphthalene;

1-hydroxy-2-[2-methoxy-4-(4-carboxyphenylazo)-5-amino-phenylazo]-3-sulpho-7-(4-carboxyphenylamino)-naphthalene 1-hydroxy-2-[2-methoxy-4-(3,5-dicarboxyphenylazo)-5-amino-phenylazo]-3-sulpho-7-(4-carboxyphenylamino)-naphthalene;

1-hydroxy-2-[2-methoxy-4-(3,5-dicarboxyphenylazo)-5-amino-phenylazo]-3-sulpho-7-amino-naphthalene;

1-hydroxy-2-[2-methoxy-4-(3-carboxyphenylazo)-5-amino-phenylazol-3-sulpho-7-amino-naphthalene; and 1-hydroxy-2-[2-methoxy-4-(3-carboxyphenylazo)-5-amino-phenylazo]-3-sulpho-7-methylamino-naphthalene.

7. A compound according to any one of claim 6 in the form of the ammonium or substituted ammonium salt.

8. An ink comprising a compound according to any one of claims 1 to 7 and a liquid medium.

9. An ink according to claim 8 wherein the liquid medium is water or a mixture comprising water and a water-soluble organic solvent.

10. A process for printing a substrate by ink jet printing by applying thereto an ink according to claim 8 or claim 9.

11. A compound according to claim 1 which has no more than 2 sulpho groups.

12. A compound according to claim 1 which has only a single sulpho group.

13. A compound according to claim 1 which has from 1 to 5 carboxy groups.

14. A compound according to claim 1 which has 2 or 3 carboxy groups.

15. An ink comprising a compound according to any one of claims 11 to 14 and a liquid medium comprising water and a water-soluble organic solvent.

* * * * *